United States Patent [19]
Iida et al.

[11] Patent Number: 5,202,836
[45] Date of Patent: Apr. 13, 1993

[54] AUTOMATED MANAGEMENT SYSTEM FOR CAR FRAMES AND PRODUCTION METHOD

[75] Inventors: Kouji Iida; Noboru Kagano; Yasuhiro Nobuoka; Kouichi Yamada; Hiromi Mitsumoto, all of Suzuka, Japan

[73] Assignee: Honda Giken Kogyo Kabushiki Kaisha, Tokyo, Japan

[21] Appl. No.: 687,001

[22] Filed: Apr. 18, 1991

[30] Foreign Application Priority Data

| Apr. 19, 1990 | [JP] | Japan | 2-103790 |
| May 31, 1990 | [JP] | Japan | 2-142618 |
| May 31, 1990 | [JP] | Japan | 2-142619 |
| Jun. 6, 1990 | [JP] | Japan | 2-148058 |
| Jun. 6, 1990 | [JP] | Japan | 2-148059 |
| Jun. 11, 1990 | [JP] | Japan | 2-151834 |
| Jun. 27, 1990 | [JP] | Japan | 2-169204 |
| Jun. 27, 1990 | [JP] | Japan | 2-169205 |

[51] Int. Cl.⁵ .............................. G06F 15/46
[52] U.S. Cl. .................... 364/468; 364/478; 364/132
[58] Field of Search ........... 364/468, 478, 469–473, 364/476, 477, 474.01–474.37, 401–403, 131–134

[56] References Cited

U.S. PATENT DOCUMENTS

| 4,120,629 | 10/1978 | Christian et al. | 364/468 X |
| 4,521,862 | 6/1985 | King et al. | 364/552 X |
| 4,683,540 | 7/1987 | Kurosu et al. | 364/468 |
| 4,958,292 | 9/1990 | Kaneko et al. | 364/468 |
| 5,077,674 | 12/1991 | Tischler et al. | 364/468 |
| 5,088,045 | 2/1992 | Shimanaka et al. | 364/469 X |
| 5,150,288 | 9/1992 | Imai et al. | 364/468 X |

FOREIGN PATENT DOCUMENTS

2239325 12/1989 United Kingdom.

Primary Examiner—Joseph Ruggiero

[57] ABSTRACT

An automated system of managing a group of frame numbers to identify each vehicle in different vehicle model groups is provided. This system comprises a first computer which creates frame number groups and a production ratios of various model vehicles to be produced according to an assigned production schedule; a second computer which takes these frame numbers and organizes them according to the production ratio and serialized numbers to be stamped; and a stamping machine to display and stamp the serialized frame numbers automatically on frame components. Accordingly, the operator is able to check the frame numbers easily with minimum human errors so as to preserve data integrity and stamping errors. This system is also applicable to mixed production of large number of models using a common assembly line.

10 Claims, 15 Drawing Sheets

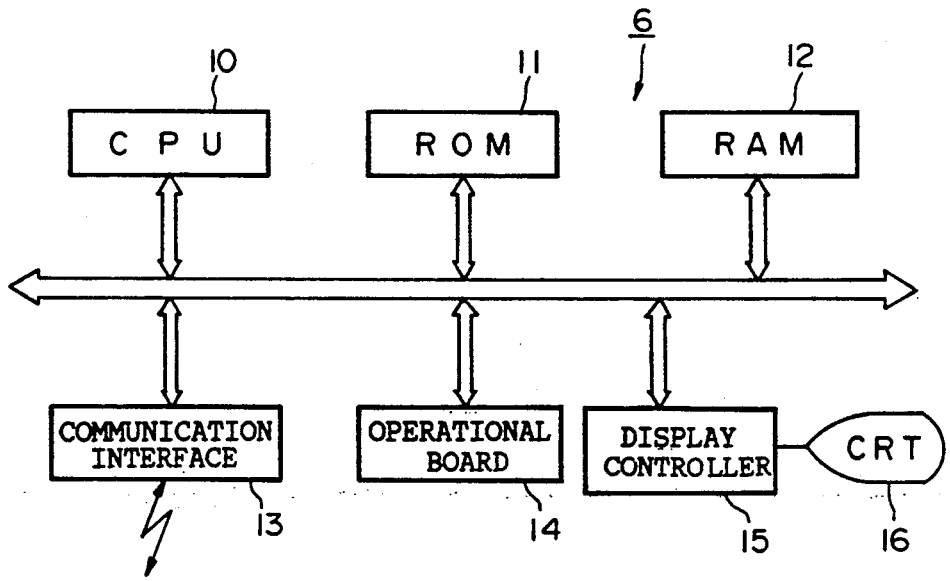
FIG.3
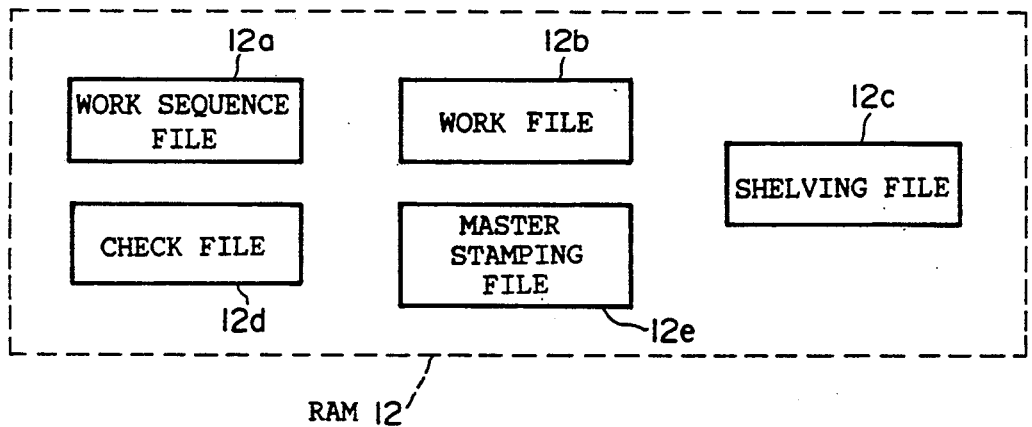
FIG.4
| MODEL DESTINATION FRAME NO. | A | | | B | | | C | | |
|---|---|---|---|---|---|---|---|---|---|
| | S1 | S2 | S3 | S1 | S2 | S3 | S1 | S2 | S3 |
| TAIL FRAME NO. | S1A0010 | S2A0015 | S3A0014 | S1B0121 | S2B0015 | S3B0301 | S1C0567 | S2C0429 | S3C0956 |
FIG.5

|  | FRAME NO. | ~ | 2 S1A0010 | ~ | 8 S2B0015 | ~ | 3 S3C0956 | ~ |
|---|---|---|---|---|---|---|---|---|
| F1 | LINE NO. | ~ | XX | ~ | XX | ~ | XX | ~ |
| F2 | PRODUCTION DATE | ~ | XXXX | ~ | XXXX | ~ | XXXX | ~ |
| F3 | WORK SEQUENCE | ~ | XX | ~ | XX | ~ | XX | ~ |
| F4 | MODEL CODE | ~ | A | ~ | B | ~ | C | ~ |
| F5 | PAINT COLOR | ~ | X | ~ | X | ~ | X | ~ |
| F6 | LOT NUMBER | ~ | XX | ~ | XX | ~ | XX | ~ |
| F8 | GROUPING | ~ | S1 | ~ | S2 | ~ | S3 | ~ |
| F10 | STAMPING MODE | ~ | XXXX | ~ | XXXX | ~ | XXXX | ~ |
| F11 | RECORD GROUP | ~ |  | ~ |  | ~ |  | ~ |

FIG.6

AUTOMATED MANAGEMENT SYSTEM FOR CAR FRAMES AND PRODUCTION METHOD

FIELD OF THE INVENTION

This invention relates to an automated system of managing an automobile assembly line, producing a number of models, by their identification numbers stamped on their frames, and also to a method of automated production based on this system.

THE BACKGROUND ART

In automobile assembly lines, for example, an identification number is stamped on chassis frames and component parts (hereinafter referred to a frames) in order to identify and distinguish various types and models of vehicles produced on the lines. This serial number, which is commonly referred to as "frame number", is also used for post-production management (registration and policing etc.) of the serialized vehicles.

The frame numbers are stamped, according to prearranged production schedules, on successive frames being produced in an assembly line. It is crucial to avoid stamping a same serial number for two or more different frames. It is clear that this will cause a multitude of management problems, because an important means for identifying a vehicle would be lost. The traditional control method for not misnumbering a frame has been to depend on the press operator to visually check the number against the scheduled listing, for example, as each frame is stamped.

This method of control has the following disadvantages.

(1) The computer generated frame numbers are given out to the operator on the basis of a weekly production of an assembly line (hereinafter referred to as the line). This is because the production planning is usually based o monthly production requirements, and from this monthly data in the main computer is obtained a weekly figure for the line production which is given out to the operator.

Under ordinary circumstances, the continuity of successive frame numbers can be assured. However, due to various human errors in computer operation, the continuity of the frame numbers can, sometimes, be interrupted. When this happens, the chances of doubling or missing frame numbers are increased. It is, therefore, crucial to check the continuity of the frame numbers, but the conventional human method of checking is quite inadequate. Additionally, the recent production trend of a mixed-mode production, i.e. a variety of different models handled within the same line, requires a greater necessity for the serial continuity of a given model. This checking requires a large degree of human effort, leading to high potential for causing misses.

(2) The frame numbers generated in the main computer are forwarded to stamping machine(s), which stamps numbers automatically on the frames. If nothing disrupts the sequence of the stamping operation, then a proper frame number is stamped on a correct frame. However, when there is a change in the production schedule, so that a frame number is in abeyance, then there is a discrepancy between the frame on the line and the number in the stamping machine. Unless checked, a wrong frame number is stamped. Therefore, it becomes essential for the press operator to check his operation closely to avoid misstamping. The problem is that human errors are unavoidable.

(3) In such a computer-managed production line, when some component is lacking, a certain batch of cars cannot be produced, and this lot must be set aside away from the line. When this happens, the entire production schedule must be reorganized, including the frame numbers which have been pre-assigned according to the original weekly schedule set by the main computer. It then necessitates regrouping of the frame numbers according to new input data from the individual production control centers. This rescheduling data entry into the main computer is performed manually and presented an undesirably deficient situation.

(4) The system described above is based on a centralized control concept, and it is difficult to provide redundancy for frame number management. If there is a problem in the main computer, there is a danger of disabling the entire production line. Therefore, from the viewpoint of the overall efficiency, this type of system lacked dependability. Furthermore, since the system is based on a top-down command structure from the upstream computer, if there is a change in the production scheduling, manual data entry is required, making the whole system vulnerable.

SUMMARY OF THE INVENTION

The purpose of the present invention is to resolve the above mentioned difficulties, (1) to (4), associated with the existing frame number management systems.

Accordingly, this relates to a new system of management of a mixed-group production scheduling based on serialized frame numbers assigned to a model group, containing a number of automobiles (hereinafter referred to as either cars meaning passenger cars or more generally as vehicles meaning passenger cars and trucks) frames of a type, generated in accordance with a production ratio of the number of cars within each group. This is further amplified below.

In this type of system-based management of an assembly line production:

A first computer generates and manages frame numbers for different model groups (hereinafter referred to as model groups) in accordance with a production ratio which defines the number of cars of a model to be produced to the total number of cars of different models to be produced in a given production period.

A second computer generates a group of serialized frame numbers for each of the model groups, in accordance with the scheduled production data for each group, and it then arranges the frame numbers within each group, in accordance with the predetermined stamping schedule.

A marking apparatus (stamping machine in the examples provided but not necessarily restricted to such mechanical means) displays the frame numbers arranged in the predetermined order, and automatically stamps the frame numbers successively onto appropriate frames according to the above predetermined production schedule.

According to the frame number management system, the first computer defines frame-number-groups (hereinafter referred to as numbers group) for each of the model groups, in accordance with a predetermined production schedule, and with the production ratios data representing the ratios of the relevant groups of cars to be produced, and registers all the data. The second computer generates serialized frame numbers for each of the numbers groups, and arrange the frame numbers in the predetermined order of stamping sequence. The stamping machine displays the frame numbers a arranged by the second computer, and stamps the numbers automatically on the frames. This system enables the operator to visually check the frame number without the intervening human effort, prevents misstamping and preserves the integrity of the data. Furthermore, such a system permits efficient production of a large variety of models.

BRIEF DESCRIPTION OF THE DRAWINGS

FIG. 3 shows a block diagram of the structure of the control section 6 in the first embodiment.

FIG. 4 shows the file configuration of a RAM 12 in the first embodiment.

FIG. 5 shows an example layout to explain the concept of the check file 12d in the first embodiment.

FIG. 6 shows an example layout to explain the concept of master stamping file 12e in the first embodiment.

PREFERRED EMBODIMENT OF THE PRESENT INVENTION

First Preferred Embodiment

Figure 1:
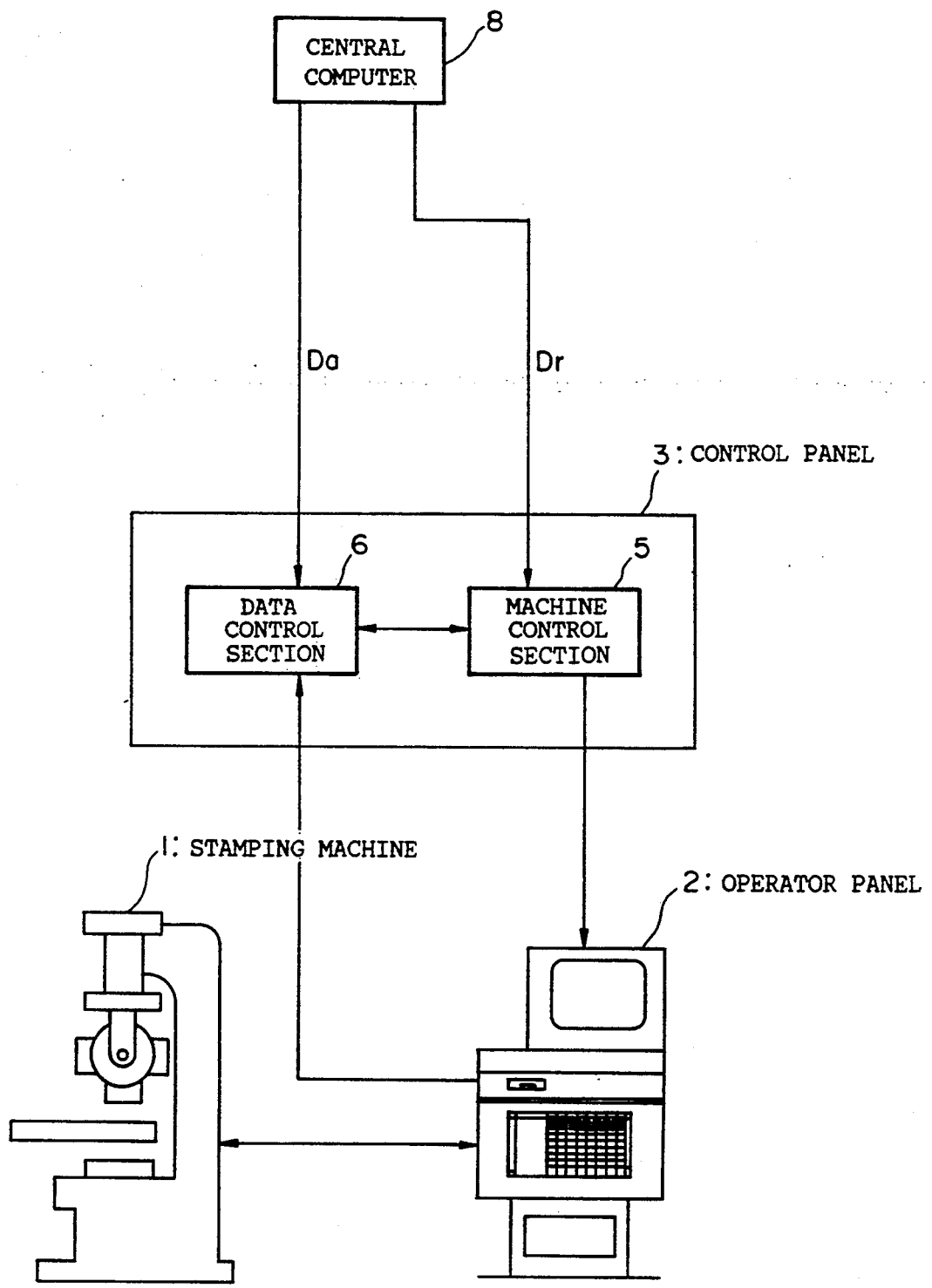
FIG. 1 shows a schematic diagram of the system configuration in a first preferred embodiment.

The first preferred embodiment of this invention will be explained in reference to the Figures. FIG. 1 presents a schematic diagram of the system configuration in a first embodiment. A marking apparatus 1 (hereinafter referred to as stamping machine (1) stamps a frame number automatically on a frame part. A press operator sets a frame component on the press and presses a button provided on a operator panel 2, which gives various commands to the press including stamping of the preassigned frame number on the frame part. The stamping press forwards a completion signal to the operator panel 2 to indicate that a complete set of frame parts for assembling a vehicle has been stamped with the correct frame number. The various operations of the press 1 are controlled by a control panel 3, which consists of a machine control section 5 and a data control section 6, and all three components operate in a unit to handle the frame data. The machine control section 5 and data control section 6 are each operatively connected with the central computer 8. The central computer 8 divides the monthly production schedule data into a weekly work sequence data $D_a$, which is supplied to the data control section 6 according to their scheduled assembly sequence.

Figure 2:
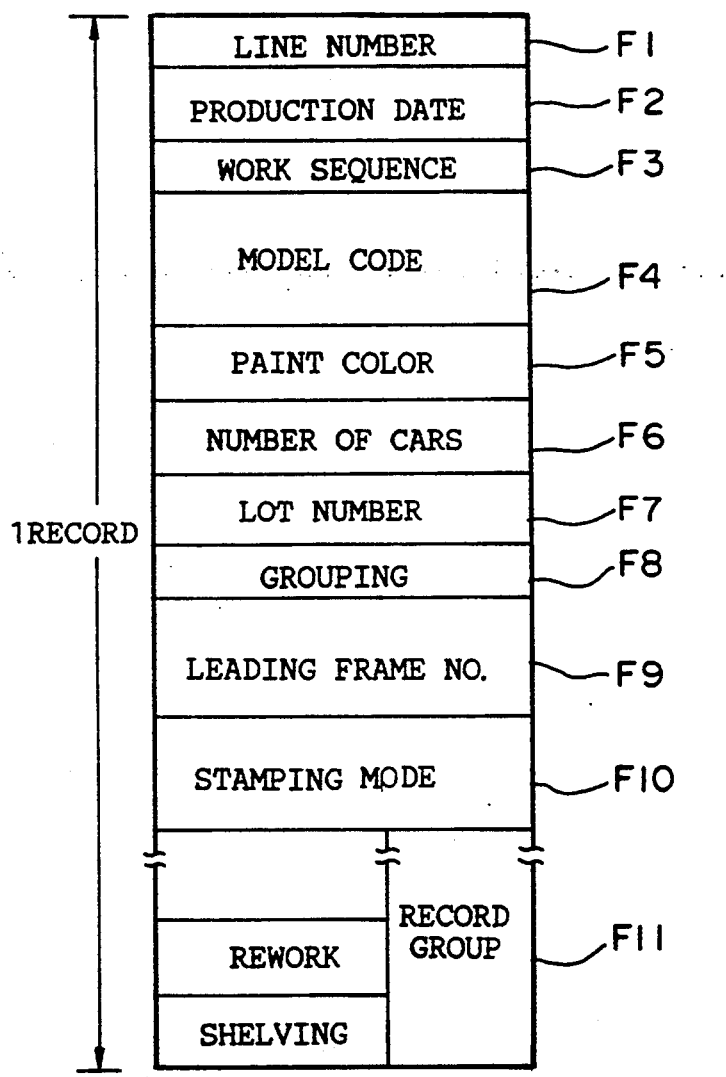
FIG. 2 shows a format of a work sequence data $D_a$ in an example of the first embodiment.

The format of work sequence data $D_a$ is explained in reference to FIG. 2. The fields are represented by F1 to F11, for example, F1 is for line identification data to recognize various lines, F3 for vehicle assembly order (work sequence), F4 for vehicle models, F7 for lot number, F8 for listing of destinations, F9 is for the initial frame number, and F11 is for data to distinguish various groupings of data. The data in F1 to F11 constitute a record set (i.e. the smallest unit of information within a numbers group) of work sequence data $D_a$ for a vehicle model and a collection of such $D_a$ to fill one week production needs constitute a weekly work sequence data $D_a$.

Returning to FIG. 1, the overall system construction is explained further. The data control section 6 receives the work sequence data $D_a$, and performs various checks (which will be explained in more detail later) including serialization checks, and supplies the processed data to machine control section 5. Machine control section 5 supplies the operator panel 2 with the frame numbers supplied by the data control section 6 along with the machine operation control signal. Section 5 also reorganizes the frame numbers according to the production ratios supplied by the central computer 8. This production ratio signifies a ratio of the various model vehicles to be assembled on the same line according to the invented system of mixed models production system. The reason for reorganizing the frame numbers is to maximize the production efficiency by choosing the optimum sequence of production of the various models according to certain ratios. For example, it is known that when A and B model vehicles are to be produced in a 3:2 ratio, the sequence of production A-B-A-A-B gives the highest efficiency. Because the frame numbers are serialized within each model group, it becomes necessary to organize the numbers according to the above pattern, for example.

Next, the operational features of the control section 6 are explained in reference to FIG. 3. A CPU 10 governs the overall control circuit, and contains a resident memory ROM 11, containing various executive programs and a temporary RAM 12 to store incidental data. The RAM 12 consists of a number of files as shown in FIG. 4, such as work sequence data file 12a for work sequence data $D_a$, work file 12b to store temporary work sequence data $D_a$, shelving file 12c which will be explained in more detail later, a check file 12d, and a master stamping file 12e. The central computer 8 and the machine control section 5 are controlled through a communications interface 13. An operational board 14 comprises a keyboard and other input devices for issuing commands to CPU 10, and a display controller 15 regulates CRT 16 under the control of CPU 10.

Next, the operational features of the check file 12d and the master stamping file 12e are explained in reference to FIGS. 5 and 6. FIG. 5 shows an example layout of the check file 12d, which stores the tail frame number for each of the model vehicle groups, for example, divided according to their destinations (e.g. name of the export country) S1, S2, S3 for example.

FIG. 6 shows an example layout of the master stamping file 12e, which contains the frame numbers table grouped according to the field data (F1-F8, F10, F11), in which the frame numbers are serialized by a process which will be described later.

Next, the action of the first embodiment is explained for a case of production of one type of vehicle model, for simplicity.

(1-1) Generation of Work Sequence Data $D_a$

After the completion of preparatory steps between the central computer 8 and data control section 6, the central computer 8 supplies the control section 6 with a batch of work sequence data $D_a$ covering a period of one week. This data batch is supplied through the communications interface 13 (refer to FIG. 3) and is stored temporarily in work file 12b in RAM 12.

The data control section 6 commands CPU 10 to compare the tail (frame number) record of data $D_a$ received in the previous run with the leading (frame number) record of the data $D_a$ of the incoming work data. The reason for doubling of the frame number record is as follows. Because the work sequence data $D_a$ obtained from the central computer is a derived result from a lot of monthly work sequence data $D_a$, doubling of records is necessary to check for data continuity.

Figure 7:
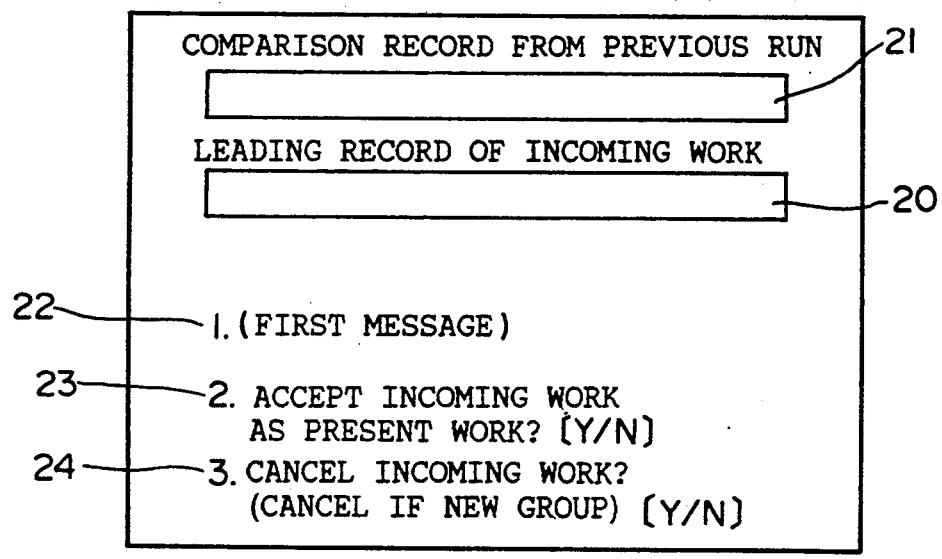
FIG. 7 shows an example display in the first embodiment.

The display controller 15 then displays a screen shown in FIG. 7 on CRT 16. In this screen, a display section 20 shows the leading record of the incoming batch of work sequence data $D_a$ forwarded from the central computer 8. A record set contains characterizing data to distinguish various groups from each other according to lot number, dates, model, color, production quantity, control number, frame number and others. The frame number in the record set is the number for the leading vehicle (of a model) in the batch and all the subsequent frame numbers within this set are generated by incrementing the leading frame number by one. A display section 21 shows a "strip" record (explained below) from the previous data. In this particular case, the previous data is a set of work sequence data $D_a$ of the previous run stored in the order of production in the work sequence data file 12a of RAM 12, and contains the strip record which should be the same as the leading record of the incoming data which is stored in the work file 12b of RAM 12.

The next step is the search process by CPU 10 for the strip record which is in both files 12a and 12b. CPU 10 picks up the leading record of the incoming work data from the temporary work file 12b, and searches for the same record in work sequence data file 1a. When the same record is found in file 12a, the message display column 22 shows a first message which reads "continuity exists in the last frame number from the previous run, Normal Production Schedule". It may also be another message which reads "continuity in the mid-section of previous run, subsequent data will be updated by the entry of new data. Change in Weekly Production Schedule, please confirm the positioning of the flag"

Figure 8:
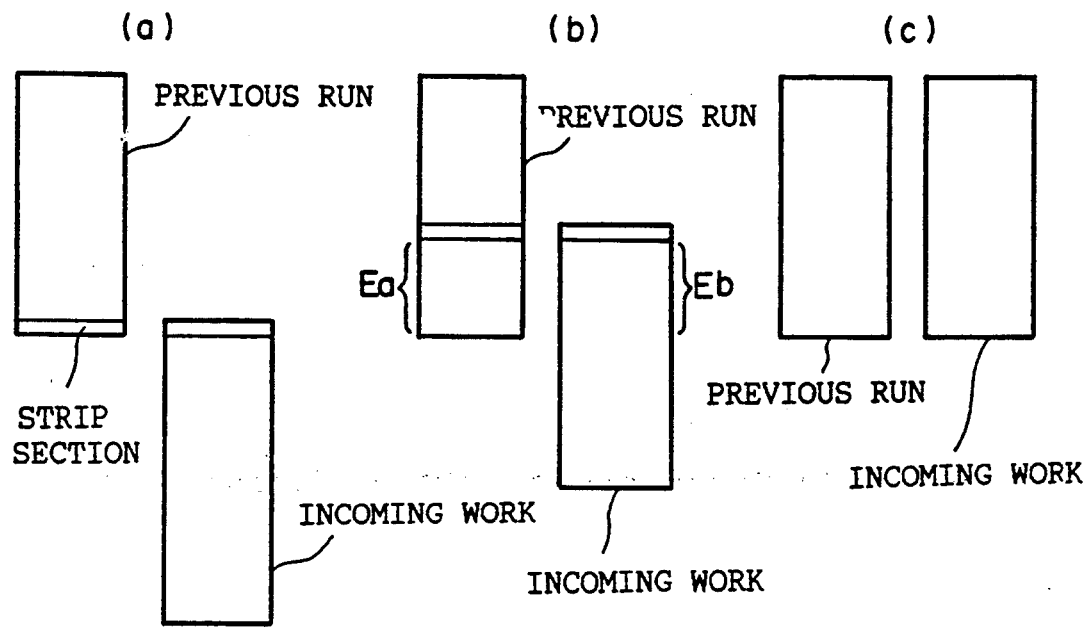
FIG. 8 shows a concept diagram for confirming serialization of the data in the first embodiment.
Figure 8:
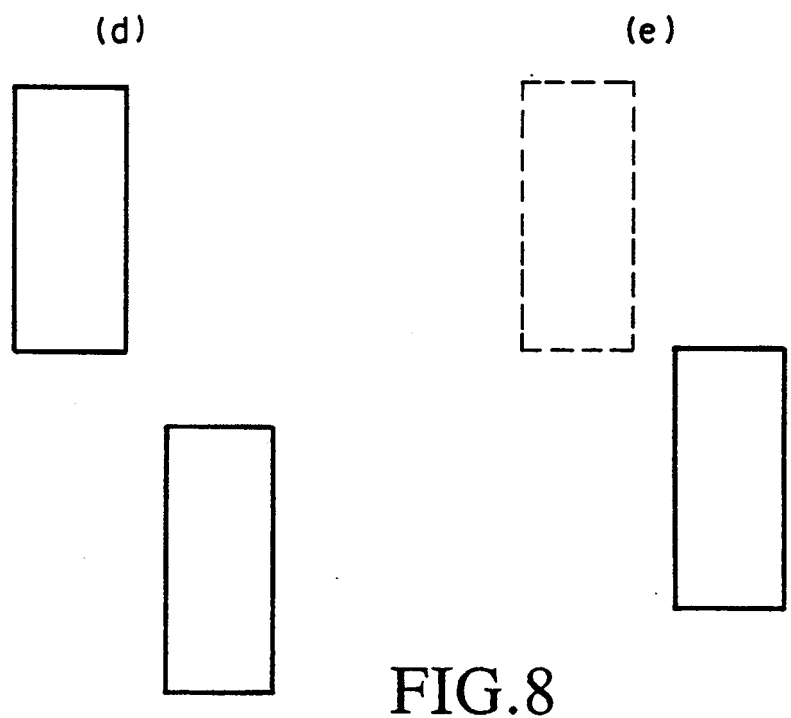

The first event (continuity exist) is shown conceptually in FIG. 8 (a), the leading record in the present record set agrees with the tail record of the previous data through the strip record shown by a so-called "adhesive strip" section. The second event is illustrated in FIG. 8 (b), which is a case of continuity in the mid-section of the previous run. The reason for providing this strip section is as follows. Because the weekly work sequence data $D_a$ is derived simply by dividing the monthly production schedule into a week schedule, the sequence continuity cannot be assured even if the last number of the previous data and the first number of the incoming work data are compared. By providing this strip, it can be confirmed positively that the record set in the previous run agrees with the record set in the incoming work, thus assuring that the two records belong to the same numbers group.

In the case of the first or the second event, a message which reads "Accept incoming work as present work?" appears in a message display section 23, shown in FIG. 7. When Y for "yes" is pressed on the keyboard of the operational board 14, CPU 10 accepts the incoming work as the present work, and the two record sets are merged. The way the record sets are merged differ depending on the event as follows.

In the case of the first message, as in FIG. 8 (a), CPU performs regular merging by merging the tail end of the previous data with the leading end of the incoming work data. On the other hand, in the case of the second message shown in FIG. 8 (b), the two sets of data are merged by replacing the data portion Ea from the previous run with the data portion Eb from the incoming work data. This type of event can happen, for example, when there is a change in a portion of the production planning. In this case, replacement operation and continuity checking are performed simultaneously. When it is necessary to replace the entire data set, as in FIG. 8 (c), the strip section begins at the leading record.

In replying to first or second message, if the reply is "No" and the N key of the operational board 14 is pressed, the message display section 24 shown in FIG. 7 displays a message which reads "Delete incoming work data? (New data set requires Delete)". If the key Y is pressed for "Yes", the temporary incoming work data in work file 12b is deleted.

The case illustrated in FIG. 8 (d) does not have data continuity. This is caused by data selection error by the central computer 8 in selecting proper record set of data $D_a$. In this case, a message appears in the display portion 22 which reads "No strip section exist in previous run, contact central computer for possible error". The press operator contacts the central computer 8, and searches for the source of error and obtains correct set of data $D_a$.

When the central computer 8 outputs a new record set of work sequence data $D_a$, there is no previous run to check against, therefore, the comparison record is the initial record. FIG. 8 (e) shows such a case, and in this case, a message appears in the display section 22 which reads "No previous data, please initialize".

After having confirmed the record continuity by following the above described process of continuity verification, the data in the temporary work file 12b (the incoming data) is registered in the work sequence data file 12a, thereby replacing the previous run data with the present data $D_a$.

In the case of data replacement shown in FIG. 8 (b), CPU 10 recognizes that there has been a change in the production schedule, and treats the incoming work data as the "replacement data". When this happens, CPU 10 displays the replacement data on CRT 16 and provides a printout of the data. CPU 10 then transfers all the data which trail the duplicating record and registers them in the shelving file 12c. CPU 10 goes on to register the data in the work file 12b, i.e., the incoming replacement data, after the duplicating record of the work sequence data file 12a. At this stage, the content of the work sequence data file 12a is replaced with the replacement data to become the present work sequence data. CPU 10 reads out the content of the present work sequence data $D_a$ successively, record at a time, to perform record checking operation described in the following.

(a) Frame Number Selection for each Vehicle

For each of the present records, comparison check is performed to verify the contents of the fields, F4 (model type), F8 (grouping:destination), F6 (No. of vehicles), F9 (initial stamping frame No.) in the check file 12d (refer to FIG. 5). That is, the initial stamping frame number is checked against the tail frame number from the previous run, and if the initial stamping number is less than the tail number, there is some divisional problem, and an error message is displayed.

On the other hand, if the initial stamping frame number is greater by one, serialization is deemed to be proper and the selection process is carried out. Selection process is the process of calculating and registering the tail frame number in the check file 12d, based on the initial stamping number (F9) and the number of vehicles to be produced (F6). By this step, the tail frame record of the check file 12d is updated.

(b) Verification of Selection and Shelving File 12c

The present records are verified in terms of the various fields, F4 (vehicle models), F8 (grouping: destinations), F6 (No. of vehicles) and F9 (initial stamping number) of the present record set against the records in the check file 12d (refer to FIG. 5). That is, the initial stamping number is compared against the previously received data for each vehicle division, and if the initial stamping number is less than the tail frame number in the check file 12d, CPU 10 concludes that there is some divisional problem, and checks the records in the shelving file 12c. If there is duplication, the record in the shelving file 12c is deleted. On the other hand, if the initial stamping number is one greater than the tail number, the selection process is carried out. The selection process is the process of calculating and registering the tail frame number in the check file 12d, based on the initial stamping number and the number of vehicles to be produced. By this step, the record of tail frame number in the check file 12d is updated.

(c) Checking by Record Division

In this step, the present record is checked against the data in the field data F11 (record division). For example, if there are warning flags in F11 indicating the presence of "rework" or "shelving", such records are to be excluded from the selection step described in (a). "Rework" means the work objects must be returned to repeat other fabricating steps and "shelving" means the frames are in temporary abeyance. If there are no such flags, the selection process of (a) is carried out.

(d) Master Stamping File Generation

During the events described under (a), when the content of the check file 12d is updated, CPU 10 arranges the content (records) into serialized frame numbers. For example, if the content is as shown in FIG. 5, the frame numbers are developed for each model groups beginning with the tail frame number assigned in each group. Keyed to these frame numbers are other field data (F1-F8, F10, F11) which are generated by CPU 10 to constitute the master stamping file 12e as shown in FIG. 6.

(1-2) Stamping Action

The data control section 6 supplies the machine control section 5 with the serialized set of frame numbers upon receiving the correct work sequence data $D_a$ from the master stamping file 12e. The machine control section 5 forwards the frame numbers to the operator panel 2, which transmits the numbers to the stamping machine 1 which registers the numbers to be stamped. The press operator sets a frame component in the machine and presses a button to stamp the correct frame number on the component. When the stamping operation is completed, the stamping machine 1 sends a completion signal to the operator panel 2 which forwards the signal to the data control section 6, which then reads out the next frame number and supplies it to the machine control section 5. By repeating this sequence of operations successively, a series of correct serialized numbers are stamped on successive frame components, without intervening human effort, and possible inclusion of doubling or missing frame numbers.

Second Preferred Embodiment

Figure 9:
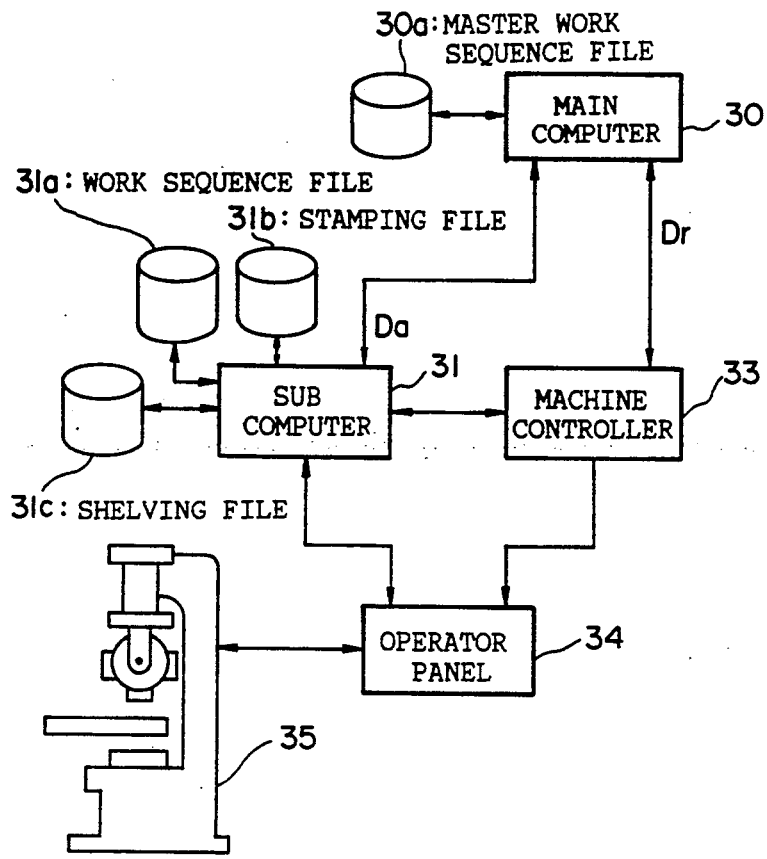
FIG. 9 shows a schematic diagram of the system configuration in a second preferred embodiment.

FIG. 9 shows a schematic diagram of the system configuration in a second preferred embodiment. In this case, the main computer 30 interacts, through a communications interface, with a host computer (not shown and is referred to as upstream computers in general terms), a subcomputer 31 and machine controller 33. That is, the main computer 30 receives work sequence data $D_a$, covering a period of three weeks (hereinafter expressed as 3-week data) transmitted from the host computer, and stores it in a master work sequence file 30a. The main computer 30 reads out the data $D_a$ covering a period of one week (1-week data) from the master work sequence file 30a, and supplies it to the subcomputer 31. The main computer 30 supplies production ratio setting data $D_r$ (to be explained later), which is stored in its internal memory, to a machine controller 33.

Subcomputer 31 communicates with the main computer 30, the machine controller 33 and the operator panel 34 through communications interface. Subcomputer 31 stores the 1-week data in a work sequence file 31a, transforms this data into a serialized series of frame numbers separated by model groups, stores the processed data in a stamping file 31b, and also forwards the data to the machine controller 33. A shelving file 31c temporarily stores work sequence data which are in suspension (hereinafter this stored data is called shelving data) due to production schedule changes. The shelving data are supplied by the operator panel 34 and are stored in the shelving file 31c.

Machine controller 33 outputs control signal to stamping machine 35, and also transmits the frame number data, supplied by the subcomputer, to the operator panel 34. The machine controller 33 also organizes the frame numbers according to the production ratio setting data $D_r$ supplied by the main computer 30. This production ratio setting data $D_r$ (hereinafter referred to as ratio data $D_r$) defines the actual number of or the ratio of the numbers of different model cars to be produced. The reason for organizing these numbers according to model and types is to maximize the efficiency of production of mixed models using one production line. For example, it is known that when A and B model cars are to be produced in a 3:2 ratio, the sequence of production A-B-A-A-B gives the highest efficiency. The frame numbers are stamped according to this grouping pattern The operator panel 34 provides frame numbers to be stamped to the stamping machine 35, and outputs command signals to operate the stamping machine 35, which stamps these numbers according t the supplied order. The operator panel 34 also carries out shelving operation (described later) when there are residual frame numbers in the machine 35 due to changes in production schedule. The operator panel 34 supplies shelving data and other control signals to subcomputer 31. The shelving data, as mentioned previously, is a set of frame numbers which is in temporary abeyance.

Figure 10:
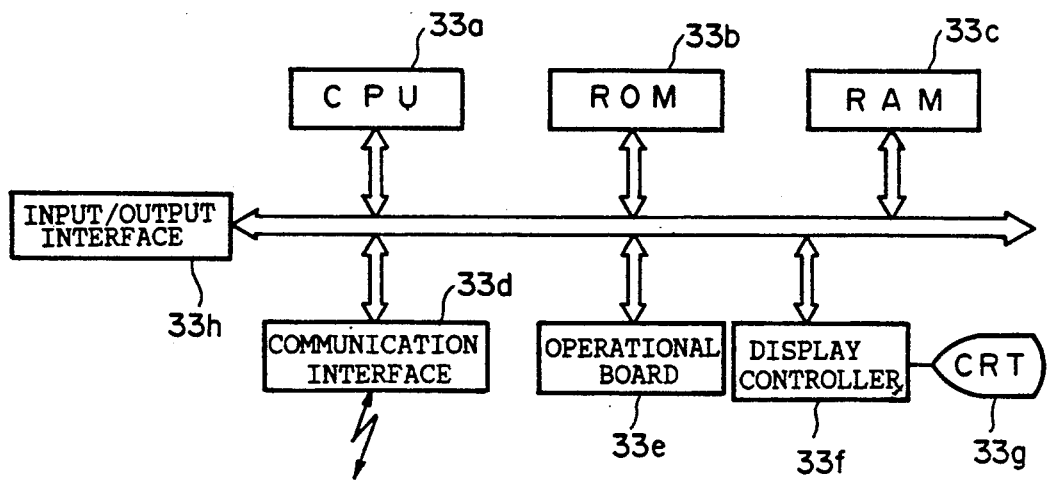
FIG. 10 shows a block diagram of the structure of the machine controller 33 in the second embodiment.

The operational features of the machine controller 33 are explained in reference to FIG. 10. In this figure, a CPU 33a governs the overall circuits, and 33b is a ROM which stores various internal programs and 33c is a RAM which stores temporary data. A communications interface 33d controls transmission of data involving the main computer 30 and subcomputer 31. The keyboard 33e and other operator section such as switches and supplies control signals to CPU 33a in accordance with commands from the keyboard. A display controller 33f controls display functions of CRT 33g under the commands of CPU 33a.

Next, the operations of the second preferred embodiment are explained in the following.

(2-1) Generation of Work Sequence Data $D_a$

The main computer 30 writes the 3-week work sequence data $D_a$ received from the host computer into work sequence master file 30a, forwards 1-week data $D_a$ to the subcomputer 31, and also responds to request from machine controller 33 for the production ratio $D_r$ to organize the frame numbers in a 3:2 ratio, for example.

Next, the subcomputer 31 writes the incoming work sequence data $D_a$ into the work sequence file 31a and at the same time, transforms the data $D_a$ into frame numbers arranged in the appropriate model groups, and stores them in the stamping file 31b. Further, the subcomputer 31 selects those data $D_a$ which are scheduled to be stamped for that day, and forwards them to the operator panel 34, and in the meantime, it also supplies the machine controller 33 with the work sequence data $D_a$ organized in the stamping order.

Next, the machine controller 33 reorganizes the incoming data $D_a$ according to the production ratio, as shown in the example above, A-B-A-A-B, and writes the resulting serialized frame numbers into a specific memory of RAM 33c (refer to FIG. 10).

(2-2) Verification of Frame Numbers

Figure 11:
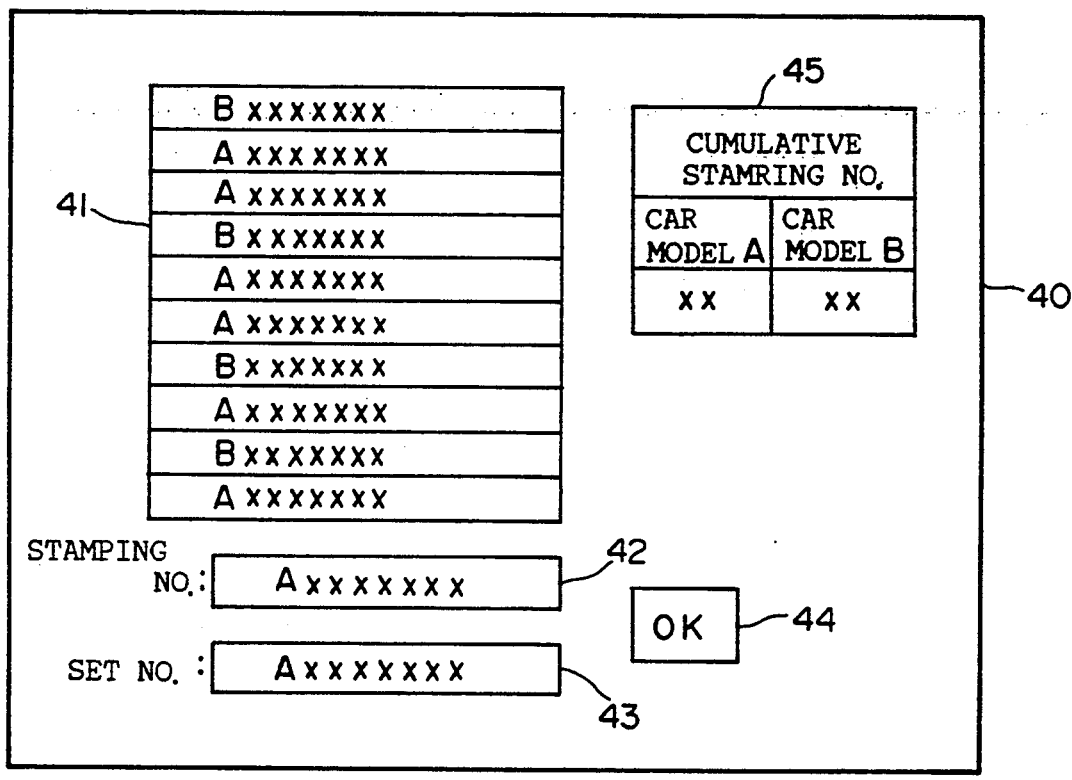
FIG. 11 shows an example of a screen display for verification of the frame numbers in the second embodiment.
Figure 11:
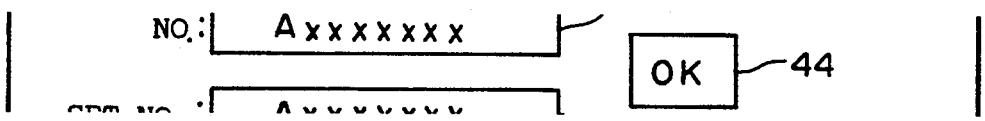

When the press operator presses the button provided on the operator panel 34 to start stamping action, a signal to commence stamping is outputted to the machine controller 33 which then begins verification process. That is, when CPU 33a receives commence stamp signal, through an input/output interface 33h, it begins a program to read out ten frame numbers in the stamping sequence and displays a screen 40 on CRT 33g, as shown in FIG. 11. The display consists of advance field 41 which contains ten frame numbers which have been organized according to the ratio setting data $D_r$. In the stamping field 42 is displayed the first frame number data to be stamped, that is, the leading frame number in the advance field 41 (the number shown in the bottom space)

CPU 33a next looks for the frame number in the stamping machine 35 and displays this number in the set number field 43. The reason for this step is to guard against a case of the machine 35 not having the frame number data transmitted from the machine controller 33. This can happen, for example, when the operator panel 34 temporarily suspends stamping of the frame numbers which had been forwarded from the machine controller 33 because of changes in the production schedule.

Next, CPU 33a compares the number shown in the stamping field 42 and the number shown in the set field 43 and check for matching. When the two numbers are identical, CPU 33a displays a "OK" sign in the confirmation space 44, and also outputs a commence stamp signal to the operator panel 34. If the numbers do not match, the space 44 is shown blank and a command is outputted to the control panel to check the frame number.

Every time a stamping operation is completed, CPU 33a updates the frame number stored in the stamping machine as well as the frame number to be stamped, and repeats the Verification step described above. The stamped number field 45 in this screen shows the cumulative number of stamping operations for each mode group.

By performing the Verification procedure as described above, it becomes possible to eliminate stamping of incorrect frame numbers on frame components.

(2-3) Frame Number Display Process

Figure 12:
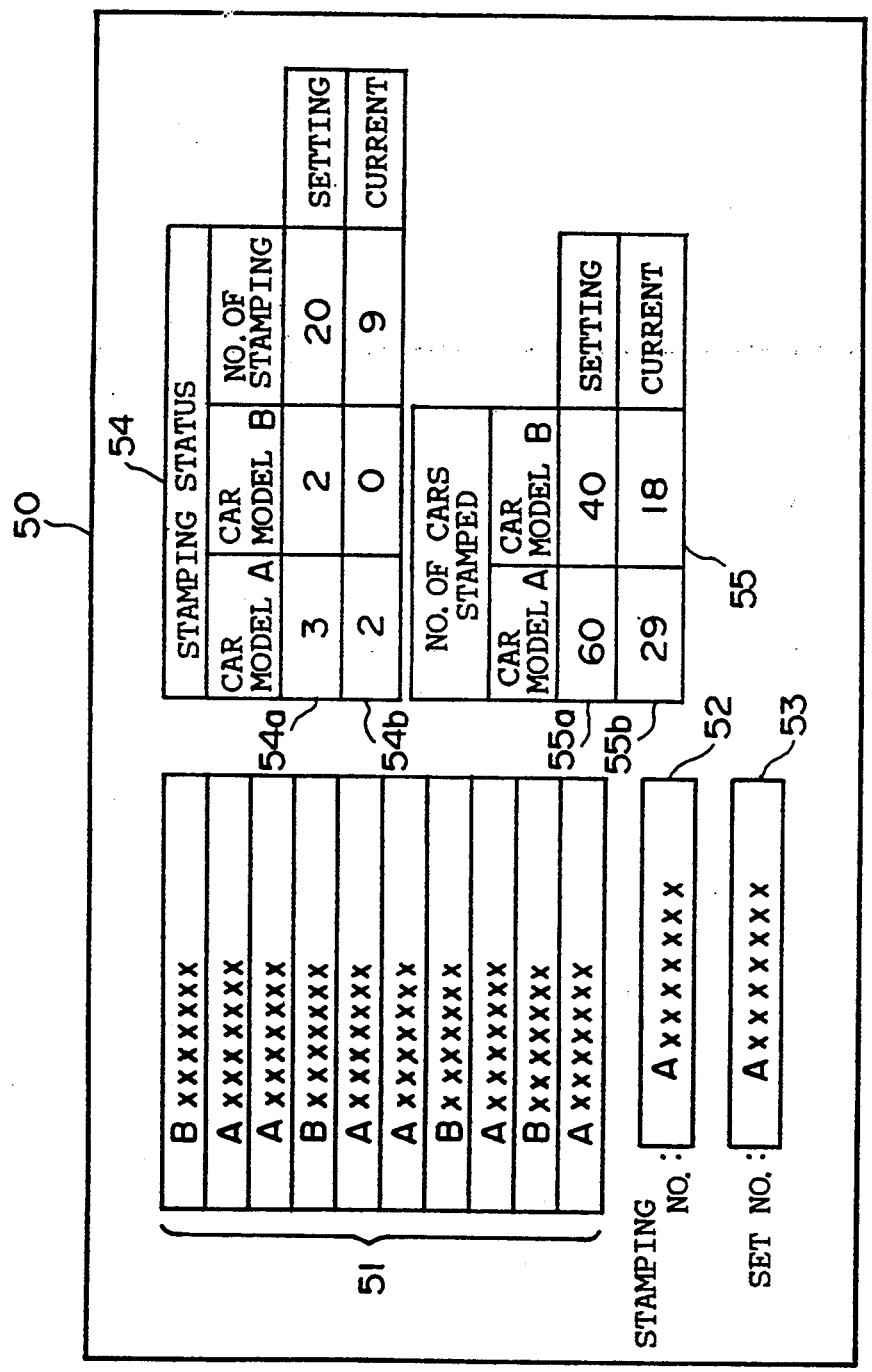
FIG. 12 shows an example Of a screen display during data manipulation routine of the frame numbers in the second embodiment.

While the stamping operation is in progress, if the operator presses a display switch provided on the control panel 34, the frame number display process begins. That is, CPU 33a of the machine controller 33 receives the process signal through the input/output interface 33h, it begins a program and displays a screen 50 on CRT 33g, as shown in FIG. 12. CPU 33a reads out ten frame numbers in the order of stamping sequence which had been organized according to previously discussed assembly sequence patterns, and displays them in the advance field display space 51. Therefore, the ten displayed numbers represent two production patterns. As before, the stamping field 52 displays the frame number to be stamped, that is, the leading number in the advance field 52 (the bottom space).

CPU 33a then checks the frame number stored in the machine 35, displays this number in the assigned number field 53, and compares this frame number in the stamping field 52 and that in the assigned number field 53. When the numbers are identical, the display color of the fields 52 and 53 is changed, and a commence stamp signal is outputted to the operator panel 34, which activates the press to stamp a component.

When CPU 33a receives the stamp completion signal from the operator panel 34, it updates the frame numbers in the stamping field 52 and the assigned number field 53. While the stamping operation is in progress, CPU 33a monitors the operation of the operator panel 34, the results of such monitoring are displayed in stamping status table 54 and the number of stamped cars table 55. The functioning of these table 54 and 55 are explained below.

The stamping status table 54 displays production ratio setting data $D_r$ in the allotted $D_r$ field 54a. In FIG. 12, an example of a case of setting ratio of 3:2 for the production ratio of A and B models, and the allotted number of patterns is shown as 20. The example indicates that the 9th pattern has been completed, and 2 cars of model A have been completed.

The stamped field 55 shows the number of cars for each model which have been stamped, and in the allotted field 55a is shown a planned number of cars for each model and the actual number of cars stamped in the actual field 55b. In this example, five cars are in a production pattern, and twenty patterns are repeated, therefore, the total number of cars stamped becomes 100. The allotted field 55a shows the allotted number of cars, in the production ratio of 3:2, as 60 and 40 for each model A and B, respectively. The actual numbers of cars completed are, since 9 patterns have been completed and 2 A cars and 0 B car have been completed, the present number is 29 cars for the A model and 18 cars for the B model as shown in the stamped number of cars table 55. Since the data are being kept up-to-date, it is easy to take control of the production situation.

(2-4) Automatic Stamping Operation

Figure 13:
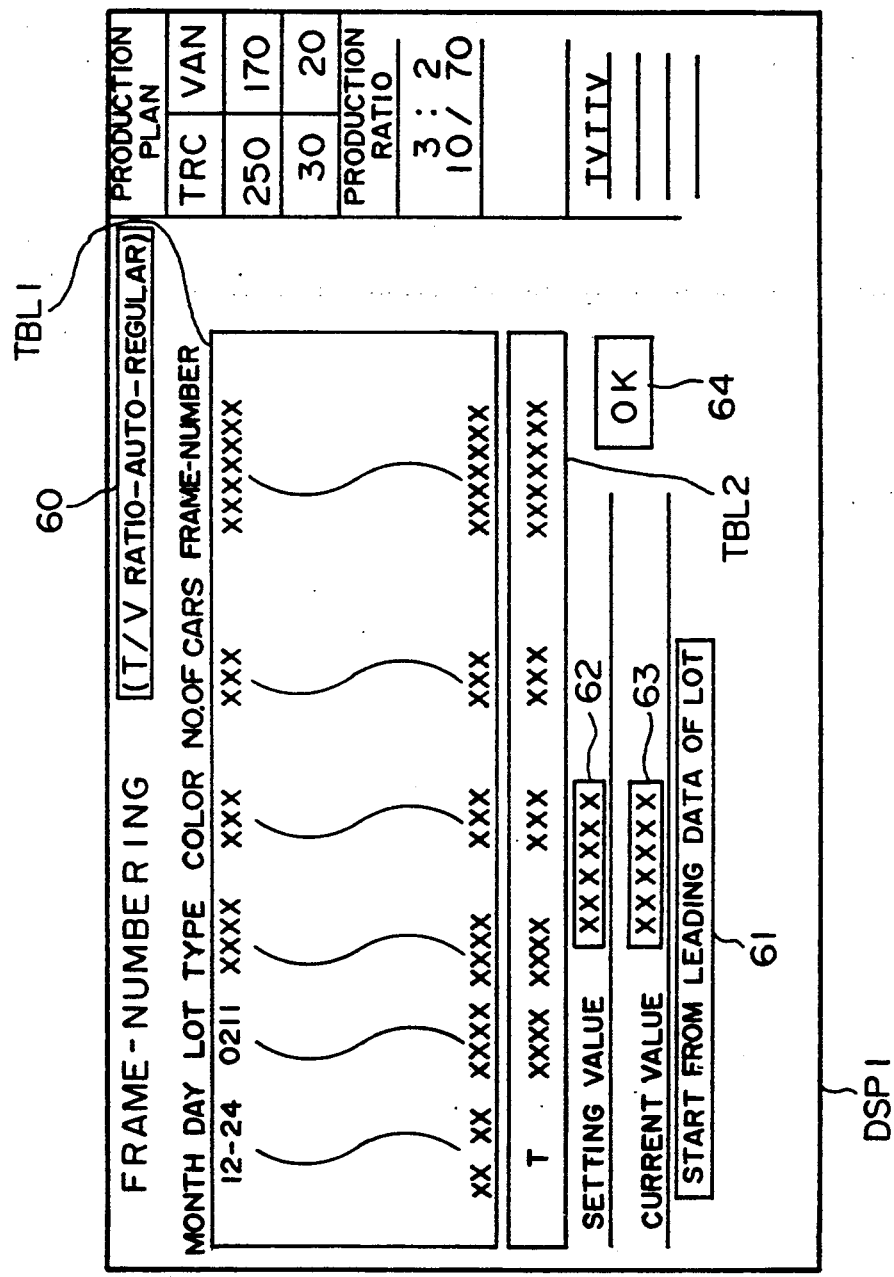
FIG. 13 shows an example of a screen display during automatic stamping routine of the frame numbers in the second embodiment.

When the operator panel 34 is set to an automatic mode, a screen DSPI as shown in FIG. 13 appears on CRT 33g. In this example, planned production mix is shown in the display area 60, which indicates that trucks TRC and vans VAN are to be produced in the ratio of 3:2. The message space 61 reads "stamping will begin from the leading number in the data lot" while in the table TBL1 are displayed work sequence data $D_a$ in the order of stamping sequence. The leading frame number is displayed in table TBL2, which is the bottom line of TBL1.

In the meantime, the frame number supplied by the machine controller 33 is incremented every time stamping is carried out and displayed in set frame number display space 62 while the current frame number display space 63 displays the assigned frame number which is stored in the stamping machine 35. When the frame numbers shown in the spaces 62 and 53 are identical, the confirmation space 64 displays "OK" and the frame component is stamped with the frame number automatically.

(2-5) Shelving Operation

Next, the shelving process of this embodiment is explained. This process is triggered by changes in production schedule and involves the steps of: shelving the work sequence data $D_a$, de-shelving of the data $D_a$ and selection process of the affected data $D_a$. These processes are carried out from the operator panel 34.

When shelving is required, the operator presses the shelving key provided on the operator section 33e (refer to FIG. 10), which changes the operational mode of the operator panel 34 from the automatic mode to shelving mode, and the machine 35 stops.

Next, the operator panel 34 transmits the shelving signal to the subcomputer 31, which in turn alert the main computer 30 to report that shelving process is required. The process is therefore always controlled by the upstream hierarchical computers.

When the operator panel 34 is set to the shelving mode, the operator can choose one of "shelving operation", "de-shelving operation" and "data deletion operation". The selection is made with a key provided on the operator section 33e. Each of these operations will be explained below.

(2-5-1) Shelving Operation

Figure 14:
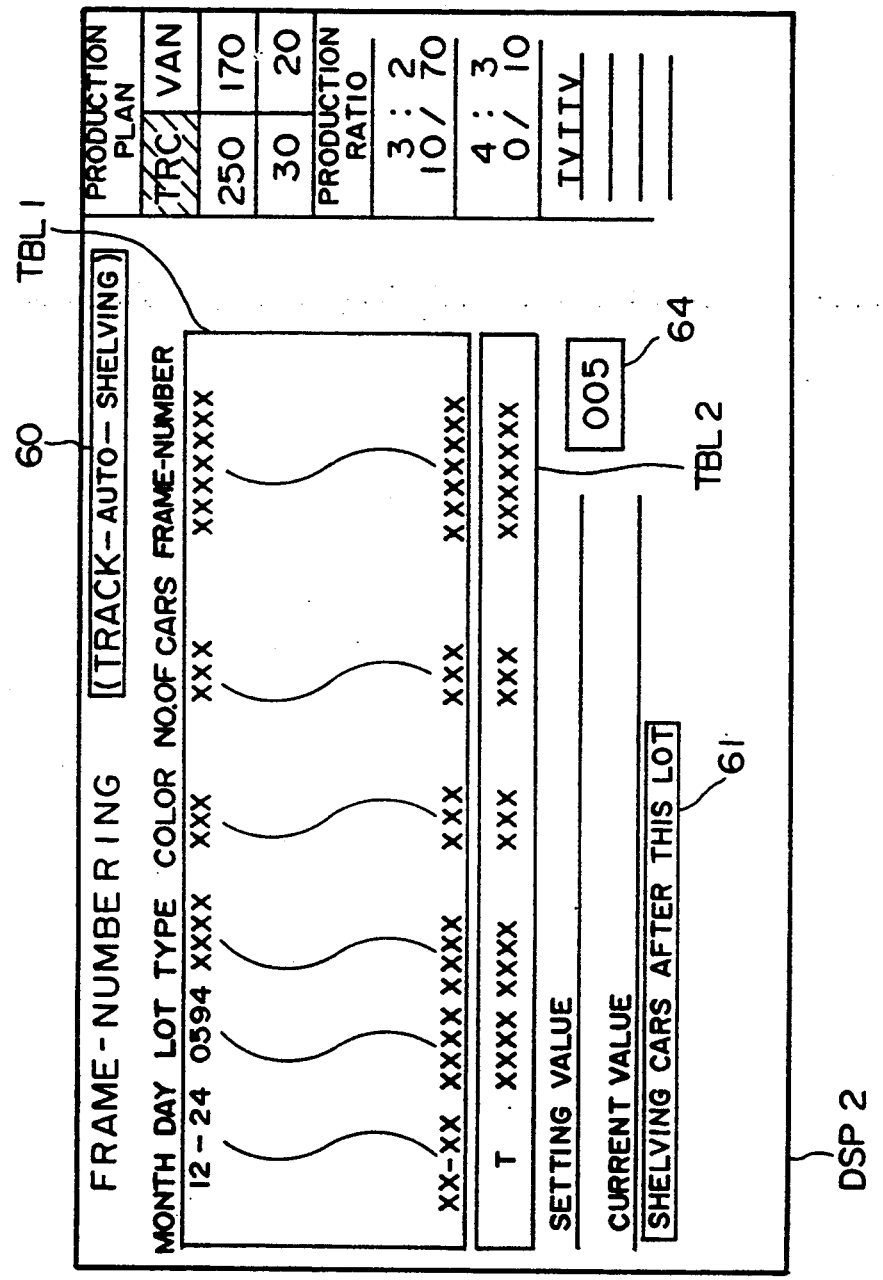
FIG. 14 shows an example of a screen display during shelving routine of the frame numbers in the second embodiment.

For this operation, the screen DSP2 shown in FIG. 14 is displayed on CRT 33g. The mode selection space 60 shows the mode to be "shelving" and the message space 61 reads "Shelving cars after this data". The operator then selects the appropriate row from among the work sequence data $D_a$ shown in TBL1 by using the cursor keys in the operator section 33e so as to block off the data lot to be shelved. The number of cars to be shelved is also entered at this time by means of the numeric keys. The number of shelved car is displayed in the space 64 and the leading shelving row is displayed in the display space TBL2, and the specified number of car is shelved. That is, CPU 33a transmits, through the communications interface 33d, the leading row (from which shelving is to begin) to subcomputer 31, which transfers the relevant row from the work sequence file 31a and registers it in the shelving file 31c. The specified number of rows beginning with the leading row are shelved. If a situation happens that the number of car data to be shelved, m, is less than the number of car data in the lot, n, then the lot A is divided into two groups; lot A1 and lot A2. Since $n \geq m$, the TBL1 which originally contained "n" car data retains (n-m) car data of the lot A1, and the shelving file 31c accepts "m" car data of the lot A2.

(2-5-2) De-shelving Operation

Figure 15:
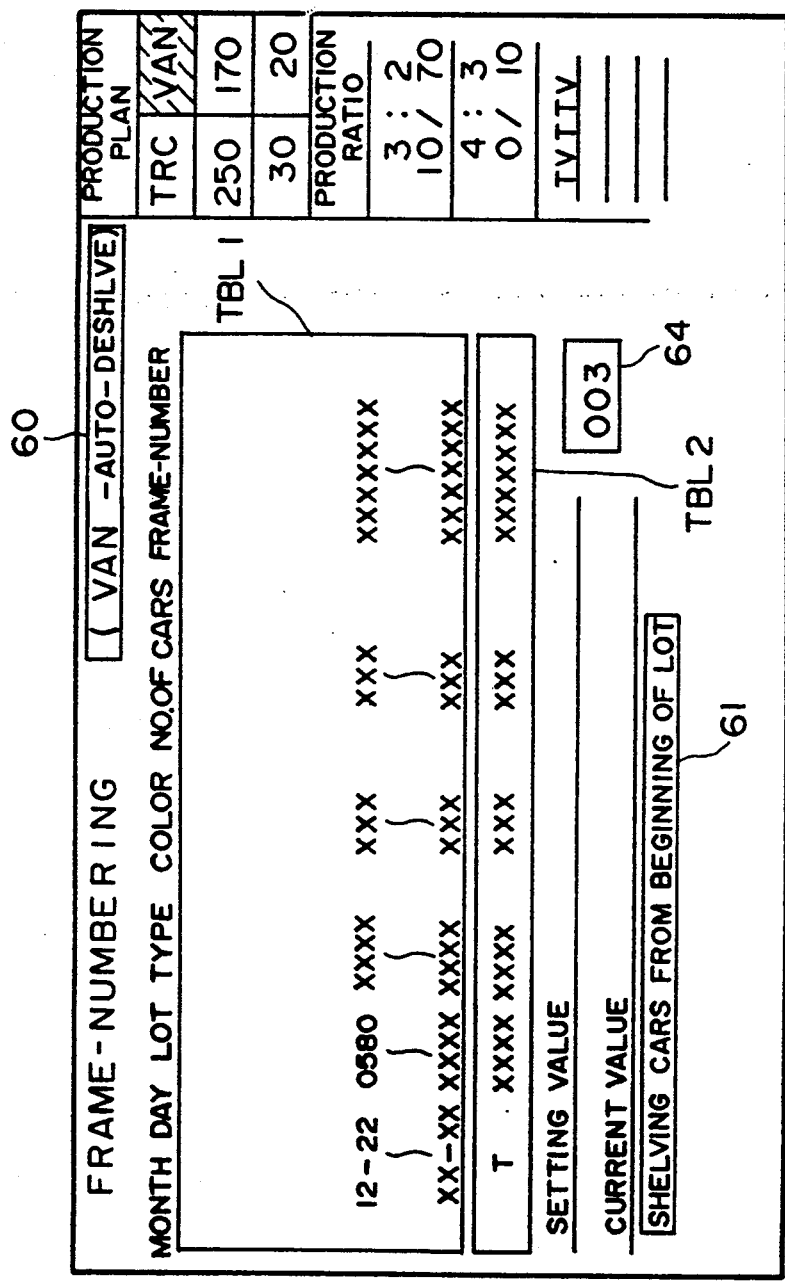
FIG. 15 shows an example of a screen display during de-shelving routine of the frame numbers in the second embodiment.

When this operation is specified, a screen DSP 3 shown in FIG. 15 is displayed on CRT 33g. The mode selection space 60 shows the mode to be "de-shelving" and the message space 61 reads "De-shelving car data after this data lot". CPU 33a requests to subcomputer 31 to temporarily transfer the shelving data from the shelving file 31c to RAM 33c and also to display the data in TBL1. The operator then selects the appropriate row from among the work sequence data $D_a$ shown in TBL1 by using the cursor keys in the operator section 33e so as to block off the data lot to be de-shelved.

The number of cars to be de-shelved is also entered at this time by means of the numeric keys in the operator section 33e. The number of de-shelved car data is displayed in the space 64 and the specified number of car data is de-shelved. That is, CPU 33a forwards the de-shelving row to the subcomputer 31, which removes this row from the de-shelving file 31c and re-register it in the work sequence file 31a in the original order of the stamping sequence.

Figure 16:
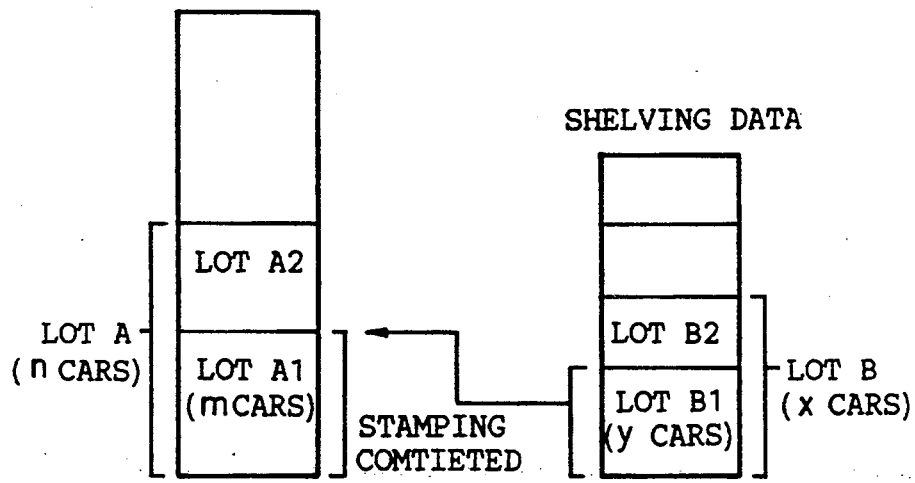
FIGS. 16 and 17 show a diagram to explain the concept of de-shelving operation.
Figure 17:
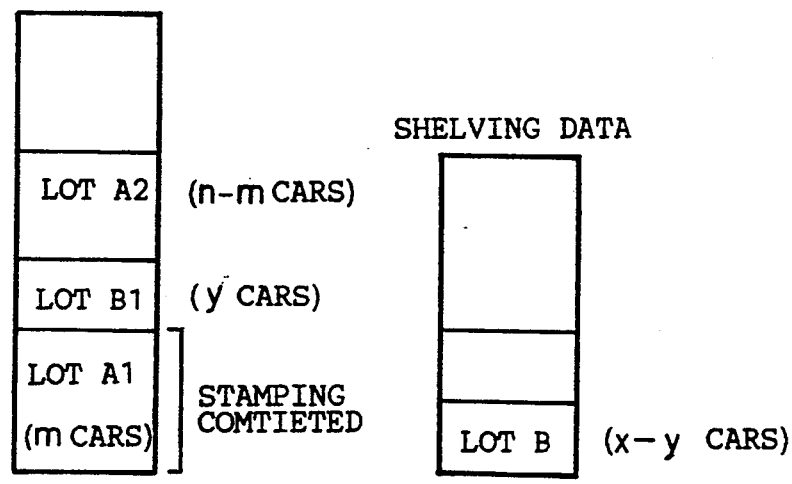

If a stamping operation was interrupted in mid-stream and the residual data was shelved, de-shelved work sequence data $D_a$ (stamping data) are returned to the original position by inserting the stamping data right after the data for which stamping has been completed. That is, before the de-shelving operation, the shelving data are divided as shown in FIG. 16, into two lots; B1 containing "y" number of car data and B2 containing (x-y) number of car data. The original stamping process on "n" number of cars where n≧m, was interrupted in mid-stream which produced two lots of data in the work sequence data file 31a; lot A1 containing "m" number of cars which have been stamped and "(n-m) number of cars yet to be stamped, as shown in FIG. 16. The "y" car data are returned to work sequence data file 31a, while preserving its original order of work sequence data $D_a$, by inserting the "y" car data right after the tail data for which stamping has been completed, as shown in FIG. 17. The "y" car data has now been inserted in between lot A1 containing "m" car data and lot A2 containing (n-m) car data. The work sequence data registered in lot B1 of the shelving data file 31c is deleted.

(2-5-3) Deleting Operation

Figure 18:
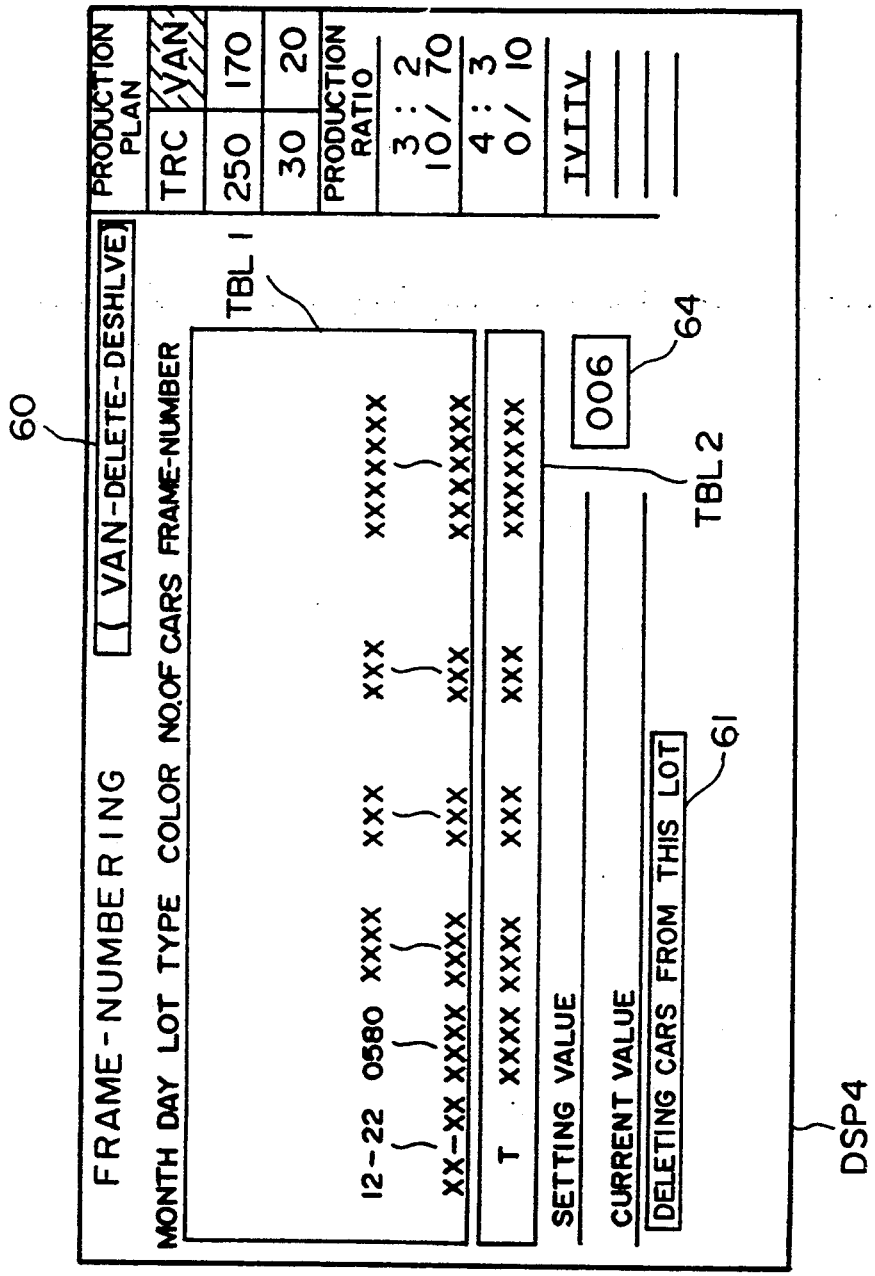
FIG. 18 shows an example of a screen display during deletion routine of the frame numbers in the second embodiment.

When this operation is specified, a screen DSP 4 shown in FIG. 18 is displayed on CRT 33g. The mode selection space 60 shows the mode to be "deleting" and the message space 61 reads "Deleting cars from this data lot". CPU 33a requests to subcomputer 31 to transfer the shelving data from the shelving file 31c to RAM 33c temporarily and also to display the data in TBL1. The operator then selects the appropriate row from among the work sequence data $D_a$ shown in TBL1 by using the cursor keys in the operator section 33e so as to block off the data lot to be deleted.

The number of car data to be deleted is also entered at this time by means of the numeric keys in the operator section 33e. The number of deleted car data is displayed in the space 64 and the specified number of car data is deleted. That is, CPU 33a forwards the deleting row to the subcomputer 31, which checks for the presence of this row in the shelving file 31c and if it exists, the subcomputer 31 deletes the appropriate number of cars from the shelving file 31c.

As discussed above, shelving and de-shelving operations can be carried out directly and efficiently from the operator panel 34, the system is ideally suited to dynamic production situations in which reworking of rejects and other unscheduled events can be handled readily by the operator. All the operational steps are monitored by the main computer 30 and subcomputer 31, and changes entered at the operator panel 34 are accurately updated by the hierarchical system so as to preserve data integrity and logic consistency.

In the preferred embodiments described above, shelving operations by the operator panel 34 were described, but such step can also be carried out by the main computer 30 equally as well. Further, the efficiency of operator panel functions can be improved even more by reorganizing the display elements in regular operation screen DSP1 (refer to FIG. 13), such as mode display space 60, message display space 61 and display space 64, so as to permit performing of shelving operation with a minimum number of steps while observing the data displayed in TBL1. For de-shelving and deleting operations, it is also possible to arrange data search by scrolling through the data stored in shelving data file 31c through the screen displays on the CRT 33g.

(2-6) Interrupt Operations

Figure 19:
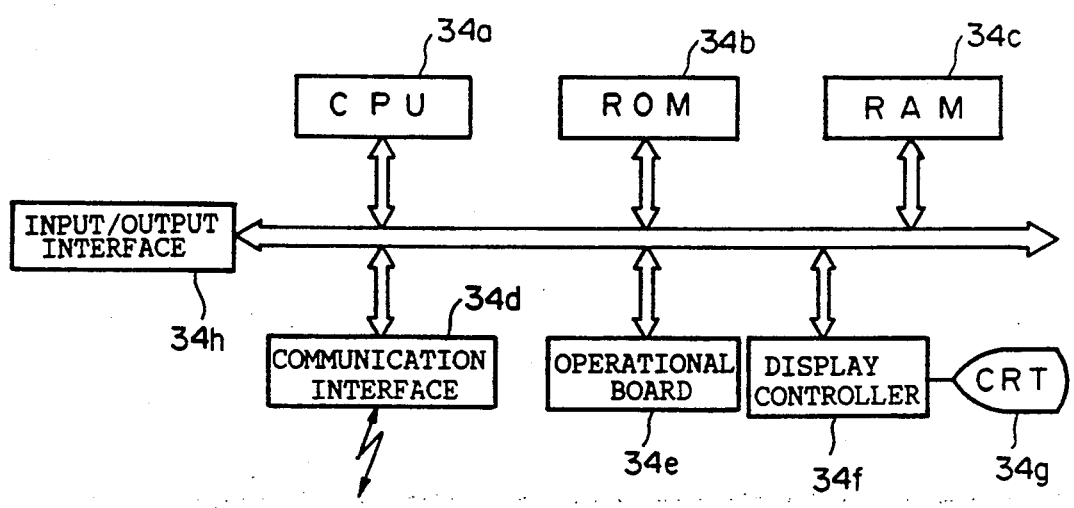
FIG. 19 shows a block diagram of the structure of the control panel 34 in the second embodiment

Interrupt operation is an operation which interrupt the scheduled stamping operations and perform stamping operations on special types of cars. Special cars mean, for example, test model cars and cars used for various testing purposes. Since these cars are not a part of regular scheduling, interrupt operation is utilized to deal with such situations directly from the operator panel 34. The operator panel 34 is structured as shown in FIG. 19.

In this figure, a CPU 34a controls the function of operator panel 34, and 34b is a ROM which stores various internal programs and 34c is a RAM which stores temporary data. A communications interface 34d controls transmission of data involving the subcomputer 31 and the machine controller 33. Keyboard and other operator section such as switches indicated by numeral 34e supply control signals to CPU 33a in accordance with commands from the keyboard. A display controller 34f controls display functions of CRT 33g under the commands of CPU 34a. Input/output interface 34h converts parallel input data supplied by CPU 34a into serialized output data to be supplied to CPU 34a.

Figure 20:
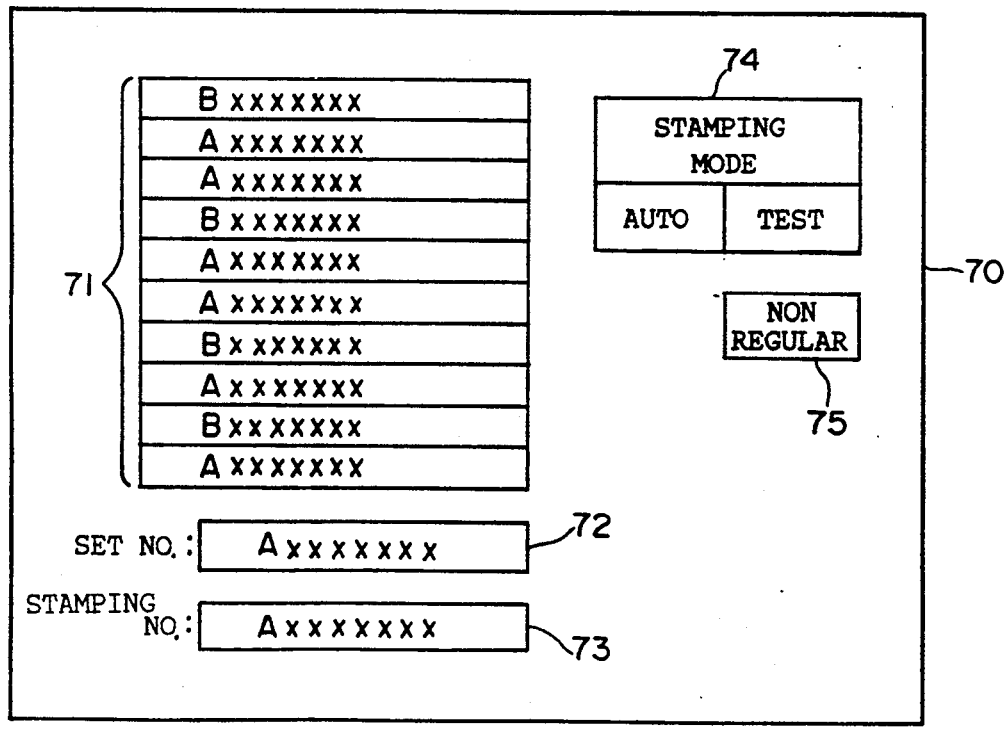
FIG. 20 shows an example of a screen display during interrupt routine of the frame numbers in the second embodiment.

When regular stamping operation is being carried out, CPU 34a displays on the CRT 33g a screen 70 shown in FIG. 20. Ten frame numbers scheduled to be stamped are listed in the advance field space 71, in the stamping order starting from the bottom row. The frame number to be stamped is entered into the stamping machine 35 and also displayed in the stamping number field 73. Every time the machine stamps the displayed number, the frame number in the stamping field 73 is updated.

When it is necessary to stamp a number on a test car, for example, the operator presses down the test stamping key provided in the operator panel 34e (refer to FIG. 19), which changes the stamping mode from automatic to test stamping mode, and this change is so indicated in the display space 74 by the change from "auto" to "test" in FIG. 20. At the same time, the operator panel 34 outputs a stop signal to the stamping machine 35, resulting in a temporary suspension of the stamping operation. The operator panel 34 transmits a signal that it is in the test mode to the subcomputer 31, which then monitors a new frame number which is generated manually by the operator panel 34.

Next, CPU 34a blinks set number field 72, which prompts the operator to enter a stamping number for the test car using the keyboard provided in the operator section 34e. The number entered is displayed in the field space 72, which stops blinking. This number is transmitted to the stamping machine 35 and is also displayed in the stamping field space 73. By these steps, the manually generated frame number is displayed in both fields 71 and 73 by CPU 34a.

At this stage, the operator operates a switch provided in the operator panel 34e to begin stamping, the test frame number shown in the space 73 is supplied to the stamping machine 35, which stamps the number on the test car. Digressing, when CPU 34a supplies the machine 35 with the manually generated number, the machine recognizes the number to be a non-regular frame number, because the machine 35 is programmed to regard any stamping excepting automatic stamping as non-regular, and the data status display section 75, in the screen 70 shown in FIG. 20, shows non-regular.

The CPU 34a supplies the test frame number to subcomputer 31 through the communications interface. The subcomputer 31 gives this test frame number a special designation and stores it in the stamping data file 31b. By this procedure, the system is able to manage the entire batch of stamped frame numbers with or without interruptions.

As soon as the interrupt operation is completed, CPU 34a returns the stamping mode of the operator panel 34 to regular stamping mode, and reverts to displays of auto stamping shown in screen 70.

Third Preferred Embodiment

In the system as described above, the work sequence data $D_a$ generated by the host computer is also stored in the main computer 30, subcomputer 31 and operator panel 34. While the stamping operation is progressing, the result of each stamping can also be supplied to update the machine controller 33, subcomputer 31 and the main computer 30, redundancy of work sequence data $D_a$ storage can be instituted in the system. When the operation is to be suspended temporarily due to production scheduling changes and other factors, the suspended work sequence data $D_a$ can be returned to subcomputer 31, which gives these data special designations and forwards them to the main computer 30 for storage. Therefore, each of the main components in the system monitors each other, and by this procedure, it becomes possible to insure data security, and thereby the process management system described is able to assure continued production even if a failure occurs in the main computer 30, by resorting to data existing in other support components.

What is claimed is:

1. An automated process of managing production of mixed model groups of vehicles in a common production line wherein:
    a model group consists of a plurality of vehicles of one model type,
    each and every vehicle in said model group processed on said line is provided with a common series of serialized identification numbers, and
    each and every model group is provided with a production ratio defined in terms of a ratio of
        a number of vehicles of said model scheduled to be produced on said line within a production period to a total number of vehicles scheduled to be produced on said line within said production period,
    wherein said total number is the sum of the number of vehicles scheduled to be produced within said production period; said process comprising the steps of:
    (a) a first processing step for generating and registering said model groups of identification numbers and to generate and assign said ratio to each of said model groups, and
    (b) a second processing step for generating said serialized identification numbers in conformity wit said production ratio for each model group and for arranging said identification numbers in an order of scheduled assembly sequence, and
    (c) a third processing step for displaying said arranged identification numbers on display means, and for placing said identification numbers automatically on corresponding vehicles.

2. An automated management system of separately and individually identifying each object by an identification number in a group of objects produced in a common production line producing a plurality of model groups of different objects wherein:
    a model group consists of a plurality of objects of one model type,
    each and every object processed in said line in said model group is provided with a common series of serialized identification numbers, and
    each and every model group is provided with a production ratio defined in terms of a ratio of
        a number of objects of said model scheduled to be produced on said line within a production period to a total number of objects scheduled to be produced on said line within said production period,
    wherein said total number is the sum of the number of objects scheduled to be produced within said production period; said system comprising:
    (a) a first control means for managing said model groups and said production ratio according to an assigned schedule, and
    (b) a second control means for generating said serialized identification numbers in conformity with said production ratio for each model group and for arranging said serialized numbers in an order of scheduled assembly sequence, and
    (c) a third control means for displaying said arranged number groups on display means, and for installing said identification numbers automatically on corresponding objects.

3. The automated management system as claimed in claim 2, wherein said object is a frame of a vehicle and said identification number is a corresponding frame number wherein:
    said second control means include,
    (a) generating means for generating frame number data groups according to: an assigned order of production of model groups; and according to an assigned schedule of assembly, such that a present data group is preceded by a preceding data group, and
    said second control means include,
    (b) communications control means for receiving data groups generated by said first means,
    (c) memory means for storing said data groups in the order of production schedule and assembly sequence,
    (d) searching means for searching for a flag means in said present data group and comparing means for comparing said flag means with said flag means disposed in a leading position in said preceding data group, and
    (e) decision means for deciding that the present data group is continuous with the preceding data group when said flag is present in the present data group, and that the present data group is not continuous with the preceding data group when said flag is absent from the present data group.

4. The automated management system as claimed in claim 3, comprising
    (a) communications control means for receiving said data group for different model groups, wherein each of said data groups contains a tail number, a leading frame number to commence marking and the number of vehicles to be marked in said group,
    (b) memory means for storing data of said groups,
    (c) data tables for recording said tail number of each group,
    (d) decision means for comparing said leading number of one data group with said tail frame number from another data group, and deciding that said two groups ar serially continuous when said initializing frame number is one number higher than said tail number, and deciding that said two groups are duplicated when said leading number is lower than said tail number and (e) a control means for controlling display of error signal when doubling is noted and for entering a new tail number in said memory means calculated according to both the number of vehicles to be produced and said leading frame number.

5. The automated management system as claimed in claim 3, comprising
   (a) communications control means for receiving data groups for different model groups,
   (b) memory means for storing data groups,
   (c) a shelving data table for storing data groups corresponding to the frames which are not to be marked,
   (d) searching means to search for a coincidence between a leading data in the present data group in said memory means and the tail data in the preceding data group, except for the tail number data in said preceding group, and to register all the frame numbers preceding said tail numbers in said shelving data table, and
   (e) control means for searching for and deleting of double registration of said shelving data in present data group stored in said memory means.

6. The automated management system as claimed in claim 3, further comprising
   (a) memory means for storing numbers data and said production ratio data to define the marking sequence of said frame numbers,
   (b) organizing means for organizing said frame numbers in conformity with the scheduled sequence of marking,
   (c) marking means for marking said frame numbers,
   (d) counting means to accumulate the number of times of marking operations conducted according to said ratio data,
   (e) display means for displaying number data supplied by said organizing means and the number of marking operations accumulated by said counting means.

7. The automated management system as claimed in claim 6, further comprising
   (a) a first data display means for displaying a frame number data supplied to said marking means,
   (b) a second data display means for displaying a frame numbers data stored in said memory means containing the frame numbers to be marked and
   (c) control and verifying means for comparing and verifying said two frame numbers in said first and second display means, and when coincidence is verified, to permit said marking means to operate, and when coincidence is not present to display warning signal to indicate the presence of an incorrect frame number so as not to proceed to marking operation.

8. The automated management system as claimed in claim 7, further comprising
   (a) first memory means for storing numbers data in the marking sequence,
   (b) second memory means for storing shelved numbers data
   (c) shelving means to select number data groups to be shelved, in accordance with changes in the production schedule, from said first memory means and register said data groups in said second memory means,
   (d) de-shelving means to select numbers data groups to be de-shelved from said second memory means, and to enter said data groups in said first memory means and
   (e) deleting means for deleting specific numbers data groups stored in said second memory means, in accordance with production schedule changes.

9. A automated system of managing identification frame numbers to be placed on corresponding frame components being produced in an automated assembly production line, comprising:
   (a) a first computing means for managing monthly production data for frame numbers supplied by an upstream computer in an hierarchical system of computation,
   (b) a second computing means for managing weekly production data supplied by said first computing means,
   (c) marking means for marking said frame components according to a production schedule specified by said second computing means, wherein said marking means is further provided with means for visually displaying a specific quantity of frame numbers in said production schedule, and
   (d) a data handling means for successively forwarding processed frame numbers back up said hierarchical system so as to retain a file of frame numbers which have been installed on said frame components in each data processing means in said hierarchical system of computation.

10. The automated system of managing identification frame numbers as claimed in claim 9: wherein
   (a) said marking means is provided with a first and a second mode selection means for manually selecting operational modes of said marking means, wherein
   (b) said first mode operation performs marking operation according to a scheduled production schedule stored in a memory section of said second computing means, and
   (c) said second mode operation performs marking operation according to an external input data stored in a memory section of an upstream computing means.

* * * * *